July 30, 1929.  H. J. WITTER  1,722,513
HOOD FOR COOKING UTENSILS
Filed March 15, 1928
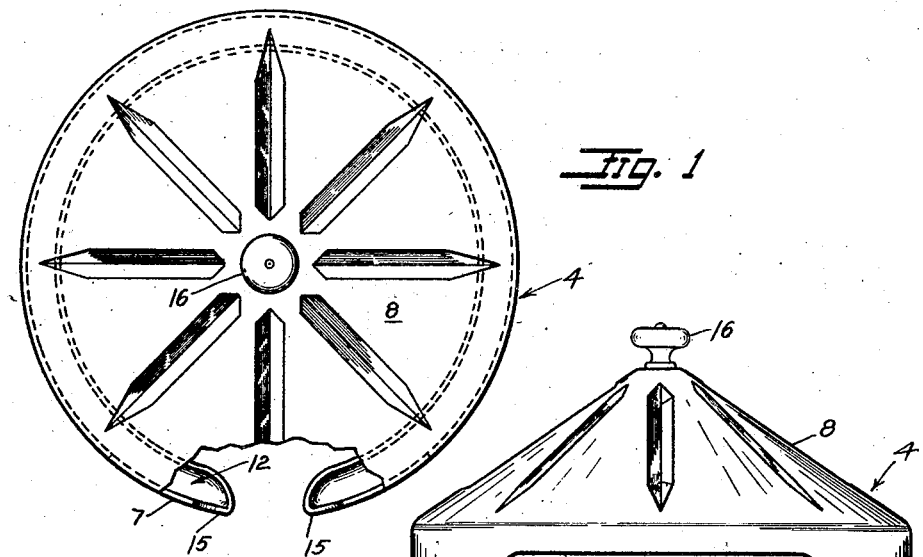
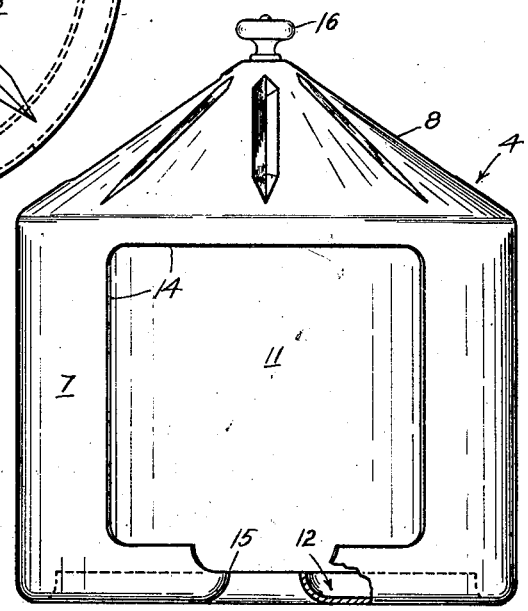
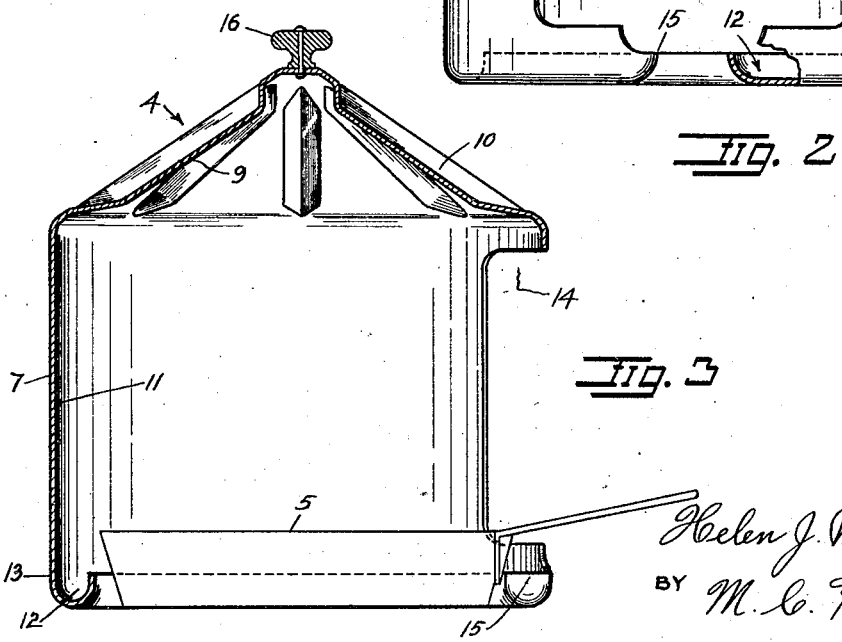
Inventor
Helen J. Witter
BY M. C. Frank
Attorney Patented July 30, 1929.

1,722,513

UNITED STATES PATENT OFFICE.

HELEN J. WITTER, OF OAKLAND, CALIFORNIA.

HOOD FOR COOKING UTENSILS.

Application filed March 15, 1928. Serial No. 261,771.

The invention relates to a hood for use with a cooking utensil such as a frying pan or a stew pot to prevent the escape of water and oil vapors from the utensil into the air of a room in which the utensil is used.

An object of the invention is to provide a hood of the character described which is arranged to be supported directly on a stove and independently of the utensil with which it is used.

Another object of the invention is to provide a hood of the character described in which a receptacle is provided for collecting condensed vapors therein.

A further object of the invention is to provide a hood of the character described so formed as to facilitate the collection in and removal from the aforesaid receptacle of the condensed vapors.

The invention possesses other objects and features of advantage, some of which with the foregoing, will be set forth in the following specification, and in the accompanying drawings, in which:

Figure 1 is a plan view of a hood embodying the invention, a portion thereof being broken away.

Figure 2 is a front view of the hood with a portion removed.

Figure 3 is a vertical side-sectional view through the hood.

As is well known, either the frying or boiling of foods in cooking utensils results in the generation of vapors which, if permitted to pass therefrom into a room, condense on the room walls and coat the same. These vapors are largely those of water and organic oils, so that their deposit on the walls and furnishings of a room is very undesirable, and it is to the provision of a hood particularly designed to prevent the escape of such vapors into a room that the present invention particularly relates.

Essentially, the device of my invention comprises a hood 4 disposable over a cooking utensil such as the frying pan 5. In the present instance, the hood 4 is designed for use with utensils of circular outline and is accordingly formed with a cylindrical side wall 7 surmounted by a conical top wall 8, as shown. The slope of the top wall 8 is such that liquids condensed on the under surface 9 thereof will run downwardly thereover to the side wall 7 rather than fall downwardly into or onto the cooking utensil. If desired, the top 8 may be fluted radially, as at 10, or otherwise to provide for the directed flow of liquid along and from the under surface 9 thereof.

Means are provided for catching and retaining the liquids which run from the top surface 9 and the inner surface 11 of the side wall 7, and as here shown such means comprises a troughlike receptacle 12 provided at the bottom edge 13 of the side wall 7 to extend inwardly therefrom. In this manner, liquids condensing in the inner top and side wall surfaces are arranged to be collected in the trough 12. The spacing of the top and side walls from the utensil is such that the temperature thereof will be low enough to effect a condensation of the vapors emitted from the utensil whereby little, if any, uncondensed vapor escapes.

The hood 4, it will now be noted, is preferably provided with a front opening 14 extending upwardly from the bottom edge 13. Desirably, and as shown, the opening 14 is of such size as to permit a view of and access to the contents of the utensil when disposed in the hood. The opening 14 is constricted somewhat where it intersects the trough 12, and the trough ends 15 thereat are formed somewhat pointed whereby they may constitute spouts for pouring liquid from the trough by and upon a forward tilting of the hood. It will be noted however, that the trough 12 might be continuous, in which event a suitable pouring lip would be provided therein below the sight opening 14.

The hood structure now described, it will be noted, is arranged to comprise a unitary and integral structure and is preferably formed of relatively thin metal. The support for the hood is provided by the bottom of the trough 12 which is arranged to directly engage a supporting surface adjacent the utensil. In this manner, the hood is arranged to be supported independently of the utensil and so may be used interchangeably with a number of utensils, such utensils thus requiring no alteration or special design thereof for use with the hood. A non-metallic knob 16 is desirably provided at the top of the hood for facilitating the handling thereof.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claim.

Having thus described my invention, I claim as new and desire to secure by Letters Patent of the United States the following:

An article of the class described composed of sheet metal and having a body portion, a closed top portion and an open bottom portion, said body portion provided with a sight and work opening and an additional opening communicating with the opening of said bottom portion adapted for the placement of the article over a handled utensil, the said bottom opening encompassed by a gutter forming the said bottom portion of the article, and the said gutter provided with a spout at a terminal thereof.

In testimony whereof, I affix my signature.

HELEN J. WITTER.